(12) United States Patent
Liu et al.

(10) Patent No.: US 10,814,448 B2
(45) Date of Patent: Oct. 27, 2020

(54) COMPREHENSIVE PERFORMANCE EVALUATION METHOD FOR CNC MACHINE TOOLS BASED ON IMPROVED PULL-OFF GRADE METHOD

(71) Applicant: Dalian University of Technology, Dalian (CN)

(72) Inventors: Kuo Liu, Dalian (CN); Haibo Liu, Dalian (CN); Te Li, Dalian (CN); Heng Chu, Dalian (CN); Yongqing Wang, Dalian (CN); Zhenyuan Jia, Dalian (CN)

(73) Assignee: DALIAN UNIVERSITY OF TECHNOLOGY, Dalian, Liaoning Province (CN)

( * ) Notice: Subject to any disclaimer, the term of this patent is extended or adjusted under 35 U.S.C. 154(b) by 0 days.

(21) Appl. No.: 16/483,256

(22) PCT Filed: Aug. 28, 2018

(86) PCT No.: PCT/CN2018/102608
§ 371 (c)(1),
(2) Date: Aug. 2, 2019

(87) PCT Pub. No.: WO2020/041955
PCT Pub. Date: Mar. 5, 2020

(65) Prior Publication Data
US 2020/0282503 A1    Sep. 10, 2020

(51) Int. Cl.
*G05B 19/414*    (2006.01)
*B23Q 17/09*    (2006.01)
*B23Q 15/12*    (2006.01)

(52) U.S. Cl.
CPC ......... *B23Q 17/0971* (2013.01); *B23Q 15/12* (2013.01); *G05B 19/4145* (2013.01); *G05B 2219/33099* (2013.01)

(58) Field of Classification Search
CPC .... B23Q 17/0971; B23Q 15/12; B23Q 15/14; B23Q 17/2471; B23Q 17/22;
(Continued)

(56) References Cited

U.S. PATENT DOCUMENTS 6,470,225 B1 * 10/2002 Yutkowitz .............. G05B 11/28
                                                           700/188
6,519,043 B1 * 2/2003 Wang ................... G01B 11/306
                                                           356/614
(Continued)

FOREIGN PATENT DOCUMENTS

CN        104898568 A      9/2015
CN        104992011 A     10/2015
(Continued)

OTHER PUBLICATIONS

Feng, Z & Yin, G. (2014). Fuzzy comprehensive evaluation of the accuracy of CNC machine tools Based on AHP. 24. 183-188. 10.3772/j.issn.1002-0470.2014.02.012, with English abstract.

*Primary Examiner* — Hung T Nguyen
(74) *Attorney, Agent, or Firm* — Muncy, Geissler, Olds & Lowe, P.C.

(57) ABSTRACT

A comprehensive performance evaluation method for the CNC machine tools based on an improved pull-off method belongs to the technical field of performance evaluation of CNC machine tools. A linear proportional method is used to standardize the performance index data of machine tool. The entropy weight method and mean variance method are used to determine the two objective weights of each level of indicator. Based on the principle of vector A comprehensive evaluation of three-level index is obtained from the linear weighted evaluation function. Finally, a similar method was used to calculate the comprehensive evaluation of a large system layer by layer. The present invention is used for the comprehensive performance evaluation of various CNC (Continued)

machine tools and also for a lateral comparison of specific performance of different machine tools, providing a scientific and possible evaluation method and process for the comprehensive performance evaluation of machine tools.

1 Claim, 2 Drawing Sheets

(58) Field of Classification Search
CPC ............ G05B 19/4145; G05B 19/4147; G05B 19/4148; G05B 19/4155; G05B 19/402; G05B 2219/37582; G05B 2219/33099; G01B 11/002; G01B 21/16; G01M 13/00
USPC ............... 340/679, 680, 686.5; 342/28, 192; 700/44, 188
See application file for complete search history.

(56) References Cited

U.S. PATENT DOCUMENTS

| | | | |
|---|---|---|---|
| 2007/0067059 A1 | 3/2007 | Travez | |
| 2018/0178339 A1* | 6/2018 | Hwang | G05B 19/402 |
| 2019/0011327 A1* | 1/2019 | Phommasith | B23Q 17/22 |

FOREIGN PATENT DOCUMENTS

| | | |
|---|---|---|
| CN | 105278460 A | 1/2016 |
| CN | 107316140 A | 11/2017 |
| CN | 107479494 A | 12/2017 |
| CN | 107695775 A | 2/2018 |
| CN | 107942940 A | 4/2018 |
| CN | 108021753 A | 5/2018 |

\* cited by examiner

COMPREHENSIVE PERFORMANCE EVALUATION METHOD FOR CNC MACHINE TOOLS BASED ON IMPROVED PULL-OFF GRADE METHOD

TECHNICAL FIELD

The present invention belongs to the technical field of performance evaluation of CNC machine tools and specifically relates to a comprehensive performance evaluation method for the CNC machine tools based on an improved pull-off method and integrated empowerment.

BACKGROUND

As the basic equipment of mechanical manufacturing, the processing performance of CNC machine tools is affected by many factors and finally reflects the quality of products. Therefore, to obtain a product with good comprehensive performance, it is necessary to improve the processing performance of CNC machine tools. Performance evaluation is one of the key points. Comprehensive evaluation of CNC machine tools is carried out before processing a number of parts to better understand the current operation status of CNC machine tools. This is to ensure that CNC machine tools can work in a state of excellent performance, thus avoiding the problem that the processing performance of machine tools cannot satisfy the performance requirements of products. To ensure the quality of parts processing, the currently used common methods involve various quality inspections on the finished parts, followed by solving the problems after finding the problems. This method has a low efficiency and large error, which not only prolongs the production cycle, but also significantly increases the production cost. The ideal solution is to periodically check the key performance indicators of CNC machine tools and find changes in the accuracy, efficiency, reliability, and energy consumption. Based on the results, the factors affecting the machining performance of machine tools are evaluated, and the required compensation or improvement is made.

Comprehensive performance evaluation of CNC machine tools is an important way to distinguish the performance of machine tools. It has great significance in optimizing the design of CNC machine tools. It also serves as a reference for users to select CNC machine tools suitable for working conditions.

At present, the evaluation of machining performance of CNC machine tools is limited, mostly on the accuracy or reliability of machine tools. The evaluation methods and theories are also relatively simple; the evaluation of comprehensive performance of machine tools has been rarely studied. However, for practical production applications, it is not comprehensive and reliable to consider only one aspect of machine performance. When a user chooses machine tools, the comprehensive performance evaluation of machine tools is essential.

In the article *Fuzzy Comprehensive Evaluation of CNC Machine Tool Performance Based on Analytic Hierarchy Process* published in Volume 1, No. 40 of *Journal of Shandong University* in 2010, Liu et al. established a comprehensive evaluation model for CNC machine tools by using the analytic hierarchy process and determined the indicators of each layer. The results of fuzzy comprehensive evaluation were obtained by using fuzzy operators and weight vectors, and the comprehensive performance of horizontal machining center was evaluated. In the article *Research on the Method of Comprehensive Error Modeling and Evaluation of Five Axis CNC Machine Tools* published in Volume 6, No. 44 of *Journal of Sichuan University* in 2012, Sun et al. proposed a comprehensive evaluation model of machine tool accuracy for geometric and servo errors, and the model was validated by conducting circular test experiments. In the article *Processing Evaluation and Error Tracing Method of Five-Axis CNC Machine Tools Based on Comprehensive Evaluation System* published in Volume 53, No. 21 of *Journal of Mechanical Engineering* in 2017, Wang et al. established a mapping relationship between the processing errors of S test piece of machine tool control system parameters through a simulation platform and developed a comprehensive evaluation system of error traceability based on the classification and evaluation of membership degree of each axis. Finally, the effectiveness of this method was verified by conducting the cutting test of a five-axis AB pendulum CNC machine tool. In 2011, Liu et al. applied for the patent A METHOD FOR EVALUATING THE PERFORMANCE OF TWO-AXIS LINKAGE OF CNC MACHINE TOOLS BASED ON ROUGH SETS with application number 201110434047.5. Using the rough set theory, the multiattribute discretization of the initial decision table was performed, and the reduction results were compared with a two-axis linkage performance decision table to obtain the evaluation result. In 2017, Li et al. applied for the patent A METHOD FOR RELIABILITY EVALUATION OF CNC MACHINE TOOLS CONSIDERING DIFFERENCES IN WORKING CONDITIONS with application number 201711273428.3. A power law distribution reliability model of hybrid machine parameters with numerical control machine tool considering the difference in working conditions was established, and a hypothesis test of power law distribution was carried out.

In summary, although extensive studies have been carried out on the performance evaluation of CNC machine tools, most of them are based on the evaluation of indicators such as accuracy or reliability; comprehensive evaluation of performance has been rarely studied. In addition, a few studies on the comprehensive evaluation of machining performance of CNC machine tools are based on the multilevel fuzzy comprehensive evaluation theory, even though fuzzy evaluation utilizes the fuzzy characteristics of some indicators of CNC machine tools and the evaluation results with distinctive grade characteristics are more intuitive. This overcomes the problem that the traditional mathematical evaluation method has a single result to some extent. There are still some shortcomings: it is difficult to solve the problem that the correlation between indicators causes the evaluation information to have greater repetitiveness; no systematic and reliable method is available to determine the membership function; the evaluation process contains a large number of subjective judgments.

SUMMARY OF THE INVENTION

The aim of the present invention is to provide a comprehensive performance evaluation method for CNC machine tools based on the improved pull-off method. The evaluation results of this method not only have a high degree of discrimination, but also facilitate vertical or horizontal comparison between the major systems and subsystems and solve the problem that the comprehensive performance of CNC machine tool cannot be quantitatively evaluated, and provide a systematic and scientific basis for the evaluation of comprehensive performance of CNC machine tools.

The technical solution of the invention:

In the comprehensive performance evaluation method for CNC machine tools based on improved pull-off grade method, the steps are as follows:

(I) Establishment of a Key Performance Index System for CNC Machine Tools

The key performance indicators of CNC machine tools are summarized as four aspects: accuracy, efficiency, reliability, and energy consumption. The effect of different factors on the comprehensive performance of CNC machine tools is quite different. The types of indicators are divided, and the subordinate relationships are analyzed. Multilevel indicator sets are established, and the evaluation system is built step by step. For the key performance indicators of CNC machine tools, the following classification is made:

First level: accuracy, efficiency, reliability, and energy consumption of CNC machine tools.

The second level: three sublevel indicators of geometric error, thermal error, and composite motion error, and specific indicators of the other three first-level indicators.

When the machine tool works in a usual manner, the error forms and sizes in different axial directions and planes are different. Therefore, the supplementary classification is as follows.

The third level: The second level of accuracy indicators are reflected in the errors of different axes and planes, including X-axis geometric error, perpendicularity error, X-feed axis thermal error, and X-Y plane roundness error.

The form and size of deviation of relative ideal position of machine tool moving parts along different axes are different; therefore, the three-level index of geometric error can be classified as follows:

The fourth level: three movement errors and rotation angle errors of each axis and the perpendicularity error among the three axes;

The affiliation relationship between the evaluation indicators at all levels is determined. According to the general process of multilevel comprehensive evaluation, the key performance index system of CNC machine tools with four-level structure is finally determined as shown in FIG. 1.

(II) Obtaining Raw Data for Evaluation Indicators

The machine tool performance data are obtained using a laser interferometer, ball bar apparatus, and other devices. The n performance indexes of m CNC machine tools are evaluated, and the original data matrix of m×n order evaluation index is constructed.

(III) Evaluation Index Pretreatment

First, all the indicators are unified into a maximal type, and the linear proportional method $m_j$, which can make the difference of evaluation values larger, the stability optimal, and retain the information about data variation to the maximum, is selected as the dimensionless method:

$$x_{ij}^* = \frac{x_{ij}}{x_j'} \quad (1)$$

where $x'_j$ is taken as the minimum value of j-th evaluation index in the sample to be evaluated;

(IV) Order Relationship Analysis Method to Determine Subjective Weight

① Determine the Order Relationship

First, select the index with the highest importance of evaluation target in the original evaluation index set as $x_1$ and then continue to screen in the remaining m−1 indicators.

Based on this principle, an order relationship of evaluation indicator set is finally determined:

$$x_1 > x_2 > \ldots > x_m \quad (2)$$

② Evaluate the Importance Degree of Adjacent Indicators

Let the rational judgment of the ratio of importance degree between the adjacent evaluation indicators $x_{k-1}$ and $x_k$ be $$r_k = \frac{w_{k-1}}{w_k}, k = m, m-1, \cdots, 2 \quad (3)$$

where the values of $r_k$ are taken as 1.0, 1.2, 1.4, 1.6, and 1.8, respectively representing that the index $x_{k-1}$ is equally important, slightly important, obviously important, strongly important, and extremely important than $x_k$.

③ Weight Coefficient Calculation

According to the evaluation of degree of importance, the subjective weighting coefficient of the index is obtained using the following formula:

$$w_m = \left(1 + \sum_{k=2}^{m} \prod_{i=k}^{m} r_i \right)^{-1} \quad (4)$$

(V) Entropy Method to Determine the Objective Weight Coefficient normalize the standardized data $$p_{ij} = \frac{x_{ij}}{\sum_{i=1}^{n} x_{ij}} \quad (5)$$

calculate the entropy of each evaluation index $$e_j = -k \sum_{i=1}^{n} p_{ij} \ln(p_{ij}) \quad (6)$$

where $k = \frac{1}{\ln n} > 0, e_j > 0$;

determine the normalized weight coefficients $$w_j = \frac{g_j}{\sum_{j=1}^{m} g_j}, j = 1, 2, \cdots, m \quad (7)$$

where the difference coefficient of each evaluation index $g_j = 1 - e_j$;

(VI) Mean Variance Method to Determine the Objective Weight Coefficient

Calculate the mean of each evaluation index $$\bar{x}_j = \frac{1}{n} \sum_{i=1}^{n} x_{ij}, j = 1, 2, \cdots, m \quad (8)$$

Calculate the mean variance of each evaluation index $$s_j^2 = \frac{1}{n}\sum_{i=1}^{n}(x_{ij} - \bar{x}_j)^2, j = 1, 2, \cdots, m \tag{9}$$

Determine the normalized weight coefficient $$w_j = \frac{s_j}{\sum_{k=1}^{m} s_k}, j = 1, 2, \cdots, m \tag{10}$$

(VII) Comprehensive Integration Empowerment Based on Pearson Correlation Coefficient The connotation of this method is to analyze the correlation between several subjective and objective weighting methods, and to obtain the quantitative correlation degree between a single weight vector and other weight vectors, and to measure the relative importance of each weighting method, highlighting the role of stable and reliable weight vectors.

For any two weight vectors $X=\{x_1, x_2, \ldots, x_n\}$, $Y=\{y_1, y_2, \ldots, y_n\}$, the correlation coefficients $P(X, Y)$ are defined as follows:

$$P(X, Y) = \frac{\sum_i (x_i - \bar{x}_i)(y_i - \bar{y}_i)}{\sqrt{\sum_i (x_i - \bar{x}_i)^2} \sqrt{\sum_i (y_i - \bar{y}_i)^2}} \tag{11}$$

where $\bar{x}_i$ and $\bar{y}_i$ are the average values of X and Y, respectively, $P(X, Y)=[-1, 1]$; when $P(X, Y)=\pm 1$, the two variables have complete linear correlation; when $P(X, Y)=0$, the two variables are linearly independent;

To facilitate subsequent calculations, adjust the value interval of $P(X, Y)$ and define the correlation between the two variables:

$$\gamma(X,Y) = \frac{1}{2}[P(X,Y)+1] \tag{12}$$

Furthermore, the total correlation between a certain weight vector $W_k$ and the remaining weight vectors can be given as $$\gamma_k = \sum_{i=1, i\neq k}^{l} \gamma(W_i, W_k), k = 1, 2, \cdots, l \tag{13}$$

The importance of weighting vector is measured by the total correlation degree, and the weighting coefficients of comprehensive integration are determined.

$$\alpha_k = \frac{\sum_{i=1, i\neq k}^{l} \gamma(W_i, W_k)}{\sum_{k=1}^{l}\sum_{i=1, i\neq k}^{l} \gamma(W_i, W_k)} \tag{14}$$

(VIII) Determine the Final Weight Coefficient Based on the Improved Pull-Off Grade Method First, each evaluation index is weighted to distinguish the degree of importance.

$$x_{ij}^{*(2,t,q)} = w_j^{(2,t,q)} x_{ij}^{(2,t,q)} \tag{15}$$

where $w_j^{(2,t,q)}$ is a comprehensive integrated weighting factor that characterizes the importance of indicator; the meaning of $x_{ij}^{(2,t,q)}$ is the standard observation of the index of the j-th subordinate to the second hierarchical subsystem $s_q^{(2,t)}$ belonging to the i-th large system, where $i=1, 2, \ldots, n$; $j=1, 2, \ldots, m_{tq}$; $t=1, 2, \ldots, n_1$; $q=1, 2, \ldots, m_t$; then, the weighted index matrix is obtained.

$$A^{(2,t,q)} = \begin{bmatrix} x_{11}^{*(2,t,q)} & \cdots & x_{1m_{tq}}^{*(2,t,q)} \\ \vdots & \ddots & \vdots \\ x_{n1}^{*(2,t,q)} & \cdots & x_{nm_{tq}}^{*(2,t,q)} \end{bmatrix} \tag{16}$$

The corresponding positive definite matrix is $$H^{(2,t,q)} = (A^{(2,t,q)})^T A^{(2,t,q)} \tag{17}$$

Constructing a comprehensive evaluation function of subsystems by linear weighted synthesis $$y_i^{(2,t,q)} = \sum_{j=1}^{m_{tq}} b_j^{(2,t,q)} x_{ij}^{*(2,t,q)}, i = 1, 2, \ldots, n \tag{18}$$

The basic idea of determining the weight coefficient vector $b^{(2,t,q)}$ is to evaluate the difference between different evaluation objects and the evaluation target to the greatest extent and convert it into a mathematical language, even though the linear comprehensive evaluation function $y_i^{(2,t,q)}$ has a maximum degree of dispersion for the comprehensive evaluation values of n evaluation objects.

If $b^{(2,t,q)}$ is the eigenvector corresponding to the largest of all the basic eigenvalues of positive definite matrix $H^{(2,t,q)}$, then the evaluation value has the highest degree of discreteness. After normalizing the eigenvector, the index weight coefficient vector is obtained. Using formula (18), the comprehensive evaluation values of all subsystems $s_q^{(2,t)}$ of the evaluation object are obtained.

(IX) Hierarchical Evaluation of Multilevel Indicators

For the three-level index of Y-axis geometric error, Z-axis geometric error, secondary indicators such as thermal error, specific performance indicators of the first-level indicators such as efficiency and reliability, repeat steps (I) to (VIII);

For the four third-level indicators $U_{111}$-$U_{114}$ under the geometric error, repeat steps (I) to (VIII) to obtain the comprehensive evaluation value of geometric error of different machine tools. It should be pointed out that the magnitude of data is consistent when the evaluation value of secondary index is calculated according to the evaluation value of three-level index; therefore, the standardization process is no longer performed.

For the three sublevel indicators $U_{11}$-$U_{13}$ under the accuracy, repeat steps (I) to (VIII) to obtain the comprehensive evaluation value of the accuracy of different machine tools.

The beneficial effects of the present invention are as follows:

(1) The present invention presents a comprehensive performance evaluation method for CNC machine tools based on an improved open-grade method, which is used for the comprehensive performance evaluation of various machine tools, and lateral comparison of specific performances of machine tools, and moreover benefits from the idea of empowerment of "maximizing the difference." The comprehensive evaluation value has a high degree of discrimination. This provides a scientific and possible evaluation method and process for the comprehensive performance evaluation of machine tools.

(2) The present invention avoids the defects of simple subjective or objective weighting in the static evaluation of CNC machine tools and combines the weight information with the integrated weighting principle based on Pearson correlation coefficient, highlighting the role of stable and reliable weight vector.

(3) The present invention is an important way to distinguish the performance of machine tools and has great significance for optimizing the design scheme of CNC machine tools. The present invention also serves as a reference for a user to select a CNC machine tool suitable for the working condition.

DRAWINGS

DETAILED DESCRIPTION

To make the technical solutions and advantageous effects of the present invention more clear, it will be described in detail below in conjunction with a static comprehensive evaluation model and with reference to the accompanying drawings. The present embodiment is carried out on the premise of a technical solution of the present invention, and detailed implementation manners and specific operation procedures are given. However, the scope of protection of the present invention is not limited to the following embodiments.

(1) Establishing a Key Performance Indicator System for CNC Machine Tools

Figure 1:
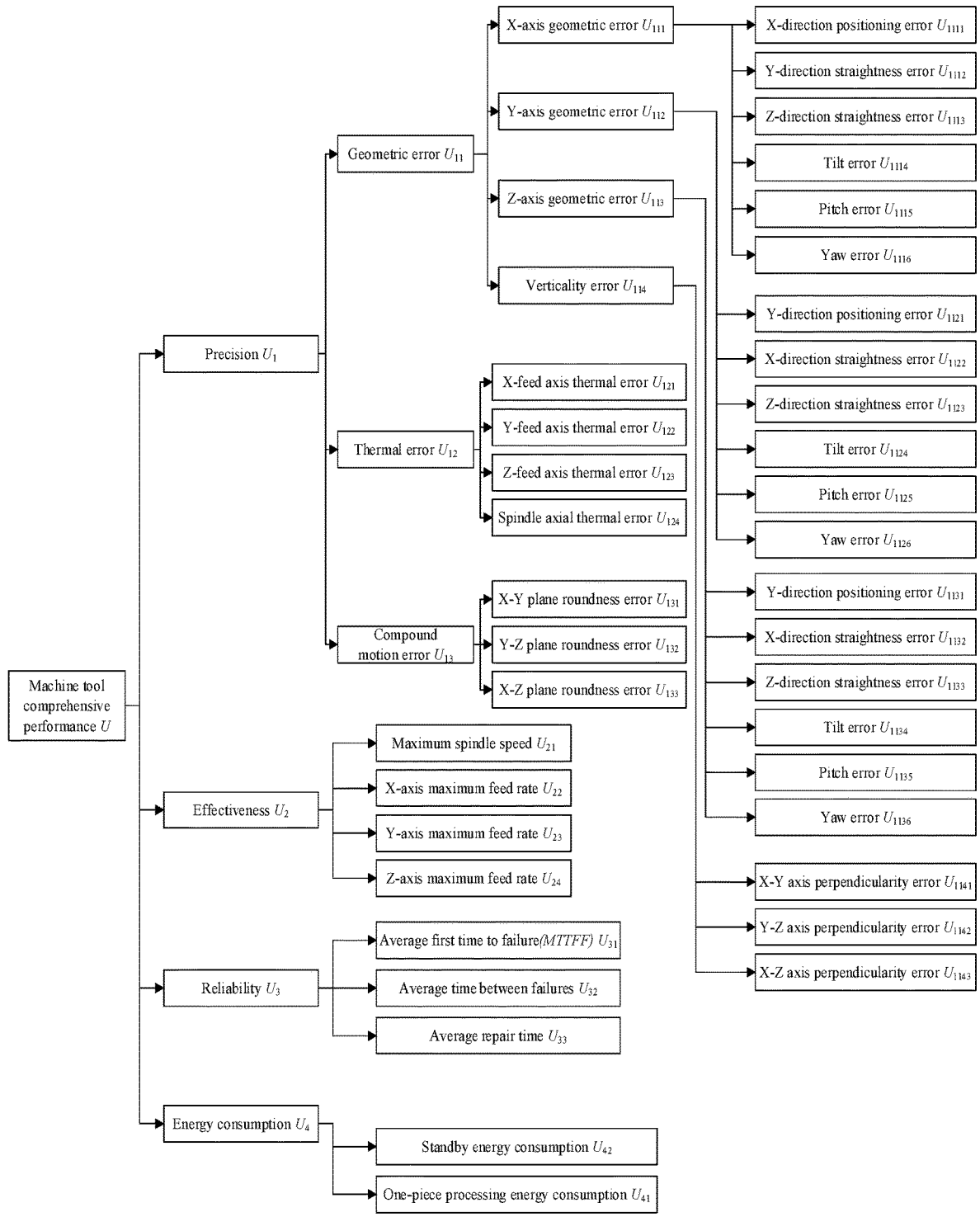
FIG. 1 shows a tree diagram of the key performance indicator system of CNC machine tools.
Figure 2:
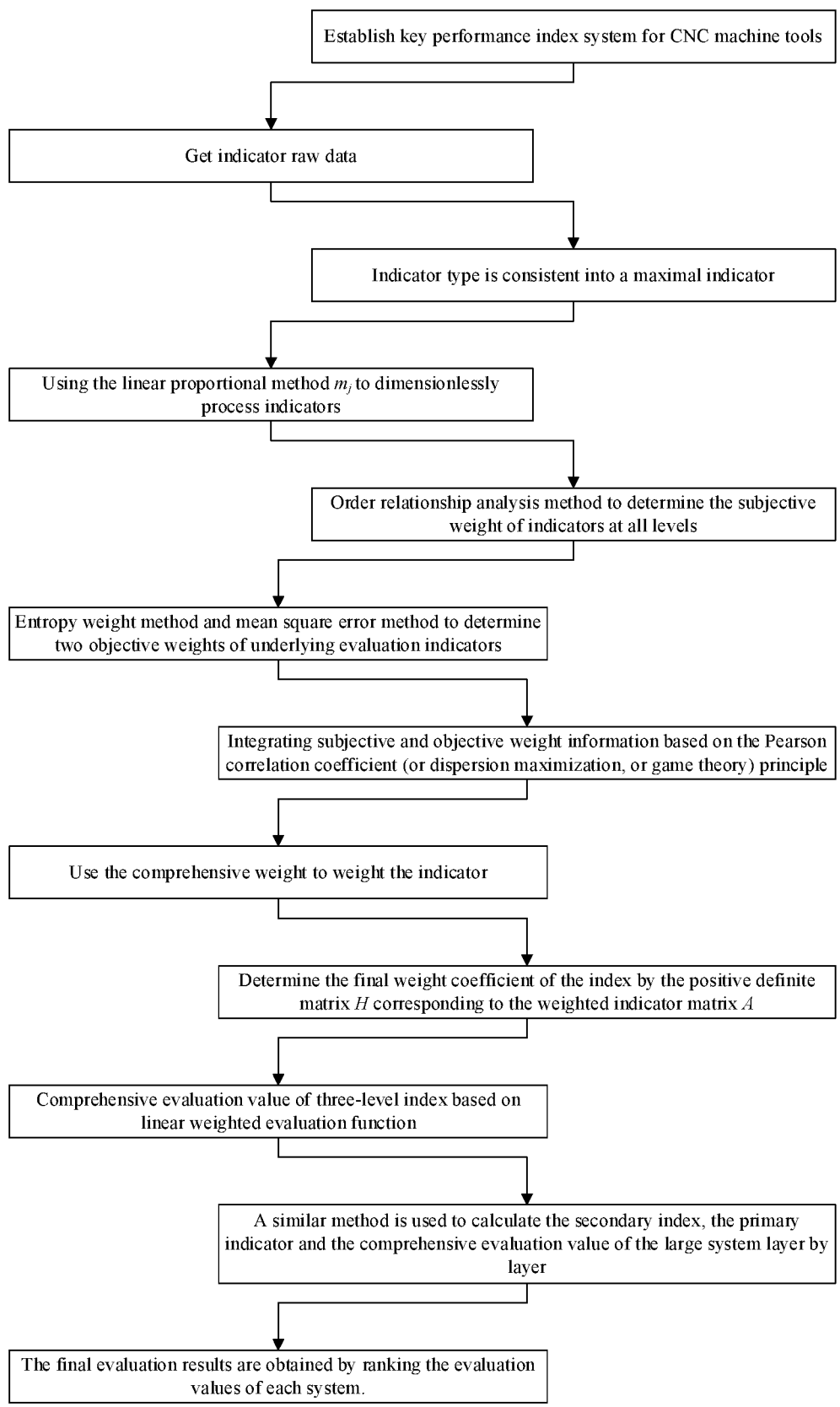
FIG. 2 shows a flow chart for the comprehensive evaluation of performance of CNC machine tools based on the improved pull-off method.

The CNC machine tool performance index system is shown in FIG. 1. The system can be decomposed into four levels of subsystems, namely, large systems: machine performance (S); first-level subsystem: accuracy ($S1^{(1)}$), efficiency ($S2^{(1)}$), reliability ($S3^{(1)}$, and energy consumption ($S4^{(1)}$); second-level subsystem: geometric error ($S1^{(2,1)}$), thermal error ($S2^{(2,1)}$), and composite motion error ($S3^{(2,1)}$; third-level subsystem: X-axis geometric error ($S1^{(3,1,1)}$), Y-axis geometric error ($S2^{(3,1,1)}$, Z-axis geometric error ($S3^{(3,1,1)}$, and verticality error ($S4^{(3,1,1)}$).

(2) Acquisition of Raw Data for Evaluation Indicators

Take the historical data of the performance test part of four different types of CNC machine tools of Shenyang Machine Tool Group as an example to demonstrate the evaluation process. The raw data of indicators are shown in Table 1.

TABLE 1

| index | Unit | No. 1 Machine Tool | No. 2 Machine Tool | No. 3 Machine Tool | No. 4 Machine Tool |
|---|---|---|---|---|---|
| $U_{1111}$ | | 0.011 | 0.022 | 0.008 | 0.014 |
| $U_{1112}$ | | 0.009 | 0.026 | 0.019 | 0.012 |
| $U_{1113}$ | mm | 0.029 | 0.017 | 0.018 | 0.019 |
| $U_{1114}$ | | 0.000012 | 0.000015 | 0.000019 | 0.000023 |
| $U_{1115}$ | | 0.000009 | 0.000013 | 0.000018 | 0.000023 |
| $U_{1116}$ | | 0.000006 | 0.000017 | 0.000012 | 0.000007 |
| $U_{1121}$ | | 0.015 | 0.013 | 0.021 | 0.029 |
| $U_{1122}$ | | 0.023 | 0.028 | 0.027 | 0.026 |
| $U_{1123}$ | mm | 0.017 | 0.031 | 0.013 | 0.021 |
| $U_{1124}$ | | 0.000021 | 0.000007 | 0.000016 | 0.000025 |
| $U_{1125}$ | | 0.000015 | 0.000016 | 0.000015 | 0.000014 |
| $U_{1126}$ | | 0.000014 | 0.000021 | 0.000019 | 0.000017 |
| $U_{1131}$ | | 0.015 | 0.015 | 0.028 | 0.041 |
| $U_{1132}$ | | 0.019 | 0.016 | 0.013 | 0.01 |
| $U_{1133}$ | mm | 0.008 | 0.011 | 0.024 | 0.037 |
| $U_{1134}$ | | 0.000018 | 0.000023 | 0.00002 | 0.000017 |
| $U_{1135}$ | | 0.000022 | 0.000014 | 0.000009 | 0.000004 |
| $U_{1136}$ | | 0.000031 | 0.000024 | 0.000017 | 0.00001 |
| $U_{1141}$ | | 0.018 | 0.015 | 0.019 | 0.023 |
| $U_{1142}$ | mm | 0.031 | 0.011 | 0.023 | 0.035 |
| $U_{1143}$ | | 0.014 | 0.018 | 0.026 | 0.034 |
| $U_{121}$ | | 0.064 | 0.051 | 0.092 | 0.133 |
| $U_{122}$ | mm | 0.033 | 0.043 | 0.031 | 0.019 |
| $U_{123}$ | | 0.059 | 0.068 | 0.046 | 0.024 |
| $U_{124}$ | | 0.074 | 0.056 | 0.077 | 0.098 |
| $U_{131}$ | mm | 0.029 | 0.026 | 0.022 | 0.018 |
| $U_{132}$ | | 0.025 | 0.019 | 0.031 | 0.043 |
| $U_{133}$ | | 0.018 | 0.027 | 0.024 | 0.036 |
| $U_{21}$ | rpm | 12000 | 8000 | 12000 | 10000 |
| $U_{22}$ | | 30 | 24 | 28 | 32 |
| $U_{23}$ | m/min | 32 | 28 | 30 | 36 |
| $U_{24}$ | | 34 | 29 | 32 | 38 |
| $U_{31}$ | | 1055 | 1124 | 1029 | 934 |
| $U_{32}$ | h | 1327 | 1437 | 1376 | 1315 |
| $U_{33}$ | | 18 | 17 | 24 | 31 |
| $U_{41}$ | Kw | 7.4 | 10.3 | 6.1 | 5.7 |
| $U_{42}$ | | 0.57 | 0.85 | 0.42 | 0.3 |

(3) Pretreatment of Evaluation Indicators

According to the linear proportional method $m_j$, the original matrix composed of all the underlying index data of the four CNC machine tools shown in Table 1 are standardized to obtain a standard observation matrix.

(4) Order Relationship Analysis Method to Determine Subjective Weight

Considering the order relationship analysis of the key performance index system of CNC machine tools shown in FIG. 1, it is necessary to design an expert score table. The consultants are professors of research in CNC machine tools at Dalian University of Technology. They have rich experience in CNC machine tools research and practice, and the reliability of scoring results is high.

The basic principle of order relationship analysis method can be stated as follows: The first step is to sort the relative importance degree of evaluation indicators and then evaluate the importance of adjacent indicators and assign them. Based on this design score sheet, a score table of the six four-level indicators under the X-axis geometric error $U_{111}$ in the evaluation index system is shown in Table 2. The design methods of other levels of indicator score tables are similar and not described here.

Take the four-level indicator importance score of X-axis geometric error as an example. The three experts who participated in the scoring provided the same ranking results for the importance of the six four-level indicators, namely, $U_{1111}>U_{1112}>U_{1113}>U_{1114}>U_{1115}>U_{1116}$; however, the importance degree was different. The assignment vector (i.e., the vector formed by the ratio of importance of each indicator in the table) is [1.4, 1.0, 1.2, 1.0, 1.0], [1.5, 1.0, 1.3, 1.0, 1.0], and [1.3, 1.0, 1.4, 1.0, 1.0], combining three assignment vectors into a 3×5 matrix and averaging each column element to obtain the final assignment vector as [1.4, 1.0, 1.3, 1.0, 1.0]. Then, using the weight calculation principle of order relationship analysis method, the subjective weight vector $U_1$=[0.2452, 0.1752, 0.1752, 0.1348, 0.1348, 0.1348] of the four-level index of X-axis geometric error is obtained.

TABLE 2

X-axis geometric error subordinate four-level indicator importance score

| $U_{1111}$~$U_{1116}$ importance degree ranking | $U_{1111}$~$U_{1116}$ importance degree assignment |
|---|---|
| most important indicator for the X-axis geometric error R1 | |
| second most important indicator for the X-axis geometric error R2 | the importance of R1 versus R2 |
| third most important indicator for the X-axis geometric error R3 | the importance of R2 versus R3 |
| fourth most important indicator for the X-axis geometric error R4 | the importance of R3 versus R4 |
| fifth most important indicator for the X-axis geometric error R5 | the importance of R4 versus R5 |

For the four primary indicators of comprehensive performance of the machine tool, the ranking results provided by the three experts are the same. All are $U_1>U_3>U_2>U_4$, and the assignment vectors are [1.5, 1.5, 1.4], [1.7, 1.6, 1.4], and [1.6, 1.4, 1.4]. The average of the columns of composite matrix is calculated to obtain the final assignment vector [1.6, 1.5, 1.4], and the subjective weight vector of the first-order index is $U_{12}$=[0.4275, 0.1781, 0.2672, 0.1272].

The process of determining the subjective weights of other score tables is similar and is not described here. Only the subjective weight vector calculation results of each level of indicators are shown in Table 3:

The system $S_1^{(3,1,1)}$ in Table 3 represents the No. 1 third-level indicator subordinate to the No. 1 second-level indicator of the No. 1 first-level indicator, representing the "X-axis geometric error" three-level subsystem; similarly, $S_1^{(2,1)}$ represents the "geometric error" secondary subsystem, and so on.

TABLE 3

Summary Table of Subjective Weight Coefficients of Indicators at Different Levels

| system | number of indicators | ordered relationship analysis method to determine subjective weight coefficients | | | | | |
|---|---|---|---|---|---|---|---|
| $S_1^{(3,1,1)}$ | 6 | 0.2452 | 0.1752 | 0.1752 | 0.1348 | 0.1348 | 0.1348 |
| $S_2^{(3,1,1)}$ | 6 | 0.2452 | 0.1752 | 0.1752 | 0.1348 | 0.1348 | 0.1348 |
| $S_3^{(3,1,1)}$ | 6 | 0.2452 | 0.1752 | 0.1752 | 0.1348 | 0.1348 | 0.1348 |
| $S_4^{(3,1,1)}$ | 3 | 1/3 | 1/3 | 1/3 | | | |
| $S_1^{(2,1)}$ | 4 | 0.2692 | 0.2692 | 0.2692 | 0.1924 | | |
| $S_2^{(2,1)}$ | 4 | 0.2174 | 0.2174 | 0.2174 | 0.3478 | | |
| $S_3^{(2,1)}$ | 3 | 0.4594 | 0.2703 | 0.2703 | | | |
| $S_1^{(1)}$ | 3 | 0.4828 | 0.3017 | 0.2155 | | | |
| $S_2^{(1)}$ | 4 | 0.3616 | 0.2128 | 0.2128 | 0.2128 | | |
| $S_3^{(1)}$ | 3 | 0.2428 | 0.4659 | 0.2913 | | | |
| $S_4^{(1)}$ | 2 | 0.5833 | 0.4167 | | | | |
| S | 4 | 0.4257 | 0.1781 | 0.2672 | 0.1272 | | |

(5) Entropy Weight Method and Mean Variance Method to Determine Objective Weight According to the above two objective weighting methods, the objective weight vector of each level of indicators can be obtained. For example, the objective weight vector of the six indicators of subsystem $S_1^{(3,1,1)}$ based on the entropy weight method is [0.1808, 0.2055, 0.1024, 0.1224, 0.1786, 0.2102]; the three index weight vectors of subsystem $S1^{(1)}$ are [0.6737, 0.0231, 0.3032].

(6) Comprehensive Integration Empowerment Based on Pearson Correlation Coefficient According to the subjective weight vector of each level index shown in Table 3, combined with the two objective weight vectors calculated using the objective data, the optimal weight vector is obtained using the integrated weighting method based on vector Pearson coefficient. The results are shown in Table 4. Each evaluation index is multiplied by the corresponding comprehensive weight (i.e., the index weighting process is performed) to obtain the weighting matrix A.

TABLE 4

List of comprehensive weights of indicators at all levels

| system | number of indicators | Comprehensive integration weighting to determine the weight coefficient (first weighting) | | | | | |
|---|---|---|---|---|---|---|---|
| $S_1^{(3,1,1)}$ | 6 | 0.1970 | 0.1923 | 0.1300 | 0.1308 | 0.1651 | 0.1849 |
| $S_2^{(3,1,1)}$ | 6 | 0.2382 | 0.0869 | 0.2191 | 0.2741 | 0.0602 | 0.1216 |
| $S_3^{(3,1,1)}$ | 6 | 0.2043 | 0.1320 | 0.2172 | 0.0770 | 0.2000 | 0.1695 |
| $S_4^{(3,1,1)}$ | 3 | 0.2152 | 0.4266 | 0.3582 | | | |
| $S_1^{(2,1)}$ | 4 | 0.2127 | 0.2058 | 0.0556 | 0.5259 | | |
| $S_2^{(2,1)}$ | 4 | 0.2843 | 0.2327 | 0.3074 | 0.1756 | | |
| $S_3^{(2,1)}$ | 3 | 0.2643 | 0.3986 | 0.3371 | | | |
| $S_1^{(1)}$ | 3 | 0.5204 | 0.1367 | 0.3429 | | | |
| $S_2^{(1)}$ | 4 | 0.4024 | 0.2121 | 0.1878 | 0.1977 | | |
| $S_3^{(1)}$ | 3 | 0.2140 | 0.1502 | 0.6358 | | | |
| $S_4^{(1)}$ | 2 | 0.3971 | 0.6029 | | | | |
| S | 4 | 0.1215 | 0.1902 | 0.2842 | 0.4041 | | |

(7) Determining the Index Weight Coefficient Based on the Improved Pull-Off Method According to the relevant principle of the pull-off method, the positive definite matrix corresponding to the weighted index matrix is given first, and then the eigenvector corresponding to the largest eigenvalue is the final weight of the index. The results are shown in Table 5.

TABLE 5

List of final weights of indicators at all levels

| system | number of indicators | Improved pull-off method to determine weight (second weight) | | | | | |
|---|---|---|---|---|---|---|---|
| $S_1^{(3,1,1)}$ | 6 | 0.2036 | 0.1981 | 0.1224 | 0.1216 | 0.1615 | 0.1929 |
| $S_2^{(3,1,1)}$ | 6 | 0.2516 | 0.0730 | 0.2294 | 0.2864 | 0.0500 | 0.1097 |
| $S_3^{(3,1,1)}$ | 6 | 0.2090 | 0.1189 | 0.2323 | 0.0645 | 0.2102 | 0.1651 |
| $S_4^{(3,1,1)}$ | 3 | 0.1983 | 0.4317 | 0.3700 | | | |
| $S_1^{(2,1)}$ | 4 | 0.1325 | 0.1552 | 0.0388 | 0.6735 | | |
| $S_2^{(2,1)}$ | 4 | 0.2988 | 0.2297 | 0.3057 | 0.1658 | | |
| $S_3^{(2,1)}$ | 3 | 0.2425 | 0.4172 | 0.3402 | | | |
| $S_1^{(1)}$ | 3 | 0.3233 | 0.1575 | 0.5191 | | | |
| $S_2^{(1)}$ | 4 | 0.4363 | 0.2063 | 0.1724 | 0.1851 | | |
| $S_3^{(1)}$ | 3 | 0.1960 | 0.1279 | 0.6761 | | | |
| $S_4^{(1)}$ | 2 | 0.3801 | 0.6199 | | | | |
| S | 4 | 0.0256 | 0.1270 | 0.3169 | 0.5305 | | |

(8) Calculation of Comprehensive Evaluation Values

Using the final weight coefficient and weighted data shown in Table 5, the evaluation values of indicators at each level are calculated step by step, and the evaluation values of the first-level indicators of CNC machine tools and the comprehensive performance evaluation values are finally obtained. The evaluation results are shown in Table 6.

TABLE 6

Summary of the comprehensive evaluation results of four CNC machine tools

| machine number | precision | effectiveness | reliability | energy consumption | comprehensive evaluation value | sort |
| --- | --- | --- | --- | --- | --- | --- |
| 1 | 0.1220 | 0.3979 | 0.6768 | 0.6903 | 0.2189 | 3 |
| 2 | 0.1274 | 0.2883 | 0.6955 | 0.5247 | 0.1825 | 4 |
| 3 | 0.1168 | 0.3894 | 0.5932 | 0.7753 | 0.2294 | 2 |
| 4 | 0.0972 | 0.3674 | 0.4910 | 0.8339 | 0.2322 | 1 |

Table 6 clearly shows the first-level performance index of the machine tool and the evaluation value of comprehensive performance, fully reflecting the performance of each machine tool. The order of comprehensive performance of the four machine tools is: No. 4>No. 3>No. 1>No. 2. Although the accuracy of No. 2 machine is the best, its comprehensive performance is the worst. The comprehensive performance of No. 4 machine is the best; however, the accuracy performance is the worst. It is observed that although the comprehensive performance of machine tool is superior, whether there is a defect in one aspect cannot be ruled out, and the performance of machine tool can be improved from the first-level performance index. For example, the accuracy of No. 4 machine can be comprehensively tested, and targeted compensation measures can be taken.

The hierarchical comprehensive evaluation based on the improved pull-off method can distinguish the advantages and disadvantages of multiple machine tools; it can also compare the performance of different machine tools at various levels to achieve comprehensive and multilevel comparative analysis.

It should be noted that the above specific application of the present invention is only intended to exemplify the principles and flow of this invention and does not constitute a limitation of this invention. Therefore, any modifications and equivalent substitutions made without departing from the idea and scope of this invention shall be included in the scope of protection of the present invention.

The invention claimed is:

1. A comprehensive performance evaluation for CNC machine tools based on improved pull-off grade method, wherein the steps are as follows:

(I) establishment of a key performance index system for CNC machine tools the key performance indicators of CNC machine tools are summarized as four aspects: accuracy, efficiency, reliability, and energy consumption; effect of different factors on the comprehensive performance of CNC machine tools is quite different; types of indicators are divided, and subordinate relationships are analyzed; multilevel indicator sets are established, and an evaluation system is built step by step; the key performance indicators of CNC machine tools, the following classification is made:

a first level: accuracy, efficiency, reliability, and energy consumption of CNC machine tools;

a second level: three sublevel indicators of geometric error, thermal error, and composite motion error, and specific indicators of an other three first-level indicators;

when a machine tool works in a usual manner, an error forms and sizes in different axial directions and planes are different; therefore, a supplementary classification is as follows;

a third level: the second level of accuracy indicators are reflected in the errors of different axes and planes, including X-axis geometric error, perpendicularity error, X-feed axis thermal error, and X-Y plane roundness error;

a form and size of deviation of relative ideal position of the machine tool moving parts along different axes are different; therefore, the three-level index of geometric error can be classified as follows:

a fourth level: three movement errors and rotation angle errors of each axis and a perpendicularity error among the three axes;

an affiliation relationship between the evaluation indicators at all levels is determined; according to a general process of multilevel comprehensive evaluation, the key performance index system of CNC machine tools with four-level structure is finally determined;

(II) obtaining raw data for evaluation indicators the machine tool performance data are obtained using a laser interferometer, ball bar apparatus, and other devices; n performance indexes of m CNC machine tools are evaluated, and the original data matrix of m×n order evaluation index is constructed;

(III) evaluation index pretreatment first, all the indicators are unified into a maximal type, and linear proportional method $m_j$, which can make a difference of evaluation values larger, a stability optimal, and retain an information about data variation to the maximum, is selected as a dimensionless method:

$$x_{ij}^* = \frac{x_{ij}}{x_j'} \qquad (1)$$

where $x'_j$ is taken as a minimum value of j-th evaluation index in a sample to be evaluated;

(IV) order relationship analysis method to determine subjective weight

① determine the order relationship first, select the index with a highest importance of evaluation target in the original evaluation index set as $x_1$ and then continue to screen in the remaining m−1 indicators; based on this principle, an order relationship of evaluation indicator set is finally determined:

$$x_1 > x_2 > \ldots > x_m \quad (2)$$

② evaluate an importance degree of adjacent indicators let a rational judgment of a ratio of importance degree between the adjacent evaluation indicators $x_{k-1}$ and $x_k$ be $$r_k = \frac{w_{k-1}}{w_k}, k = m, m-1, \ldots, 2 \quad (3)$$

where values of $r_k$ are taken as 1.0, 1.2, 1.4, 1.6, and 1.8, respectively representing that an index $x_{k-1}$ is equally important, slightly important, obviously important, strongly important, and extremely important than $x_k$;

③ weight coefficient calculation according to the evaluation of degree of importance, a subjective weighting coefficient of the index is obtained using the following formula:

$$w_m = \left(1 + \sum_{k=2}^{m} \prod_{i=k}^{m} r_i\right)^{-1} \quad (4)$$

(V) entropy method to determine an objective weight coefficient

① normalize a standardized data $$p_{ij} = \frac{x_{ij}}{\sum_{i=1}^{n} x_{ij}} \quad (5)$$

② calculate the entropy of each evaluation index $$e_j = -k \sum_{i=1}^{n} p_{ij} \ln(p_{ij}) \quad (6)$$

where $k = \frac{1}{\ln n} > 0, e_j > 0$;

③ determine a normalized weight coefficients $$w_j = \frac{g_j}{\sum_{j=1}^{m} g_j}, j = 1, 2, \ldots, m \quad (7)$$

where a difference coefficient of each evaluation index $g_j = 1 - e_j$;

(VI) indicate variance method to determine the objective weight coefficient

① calculate the indication of each evaluation index $$\overline{x}_j = \frac{1}{n} \sum_{i=1}^{n} x_{ij}, j = 1, 2, \ldots, m \quad (8)$$

② calculate the indication variance of each evaluation index $$s_j^2 = \frac{1}{n} \sum_{i=1}^{n} (x_{ij} - \overline{x}_j)^2, j = 1, 2, \ldots, m \quad (9)$$

③ determine the normalized weight coefficient $$w_j = \frac{s_j}{\sum_{k=1}^{m} s_k}, j = 1, 2, \ldots, m \quad (10)$$

(VII) comprehensive integration empowerment based on Pearson correlation coefficient a connotation of this method is to analyze a correlation between several subjective and objective weighting methods, and to obtain the quantitative correlation degree between a single weight vector and other weight vectors, and to measure the relative importance of each weighting method, highlighting the role of stable and reliable weight vectors;

for any two weight vectors $X = \{x_1, x_2, \ldots, x_n\}$, $Y = \{y_1, y_2, \ldots, y_n\}$, the correlation coefficients $P(X, Y)$ are defined as follows:

$$P(X, Y) = \frac{\sum_i (x_i - \overline{x}_j)(y_i - \overline{y}_j)}{\sqrt{\sum_i (x - \overline{x}_i)^2} \sqrt{\sum_i (y_i - \overline{y}_i)^2}} \quad (11)$$

where $\overline{x}_i$ and $\overline{y}_i$ are an average values of X and Y, respectively, $P(X, Y) = [-1, 1]$; when $P(X, Y) = \pm 1$, two variables have complete linear correlation; when $P(X, Y) = 0$, the two variables are linearly independent;

to facilitate subsequent calculations, adjust the value interval of $P(X, Y)$ and define the correlation between the two variables:

$$\gamma(X, Y) = \frac{1}{2}[P(X, Y) + 1] \quad (12)$$

furthermore, a total correlation between a certain weight vector $W_k$ and the remaining weight vectors can be given as $$\gamma_k = \sum_{i=1, i \neq k}^{l} \gamma(W_i, W_k), k = 1, 2, \ldots, l \quad (13)$$

an importance of weighting vector is measured by the total correlation degree, and the weighting coefficients of comprehensive integration are determined $$\alpha_k = \frac{\sum_{i=1, i \neq k}^{l} \gamma(W_i, W_k)}{\sum_{k=1}^{l} \sum_{i=1, i \neq k}^{l} \gamma(W_i, W_k)} \quad (14)$$

(VIII) determine a final weight coefficient based on the improved pull-off grade method first, each evaluation index is weighted to distinguish the degree of importance $$x_{ij}*^{(2,t,q)} = w_j^{(2,t,q)} x_{ij}^{(2,t,q)} \quad (15)$$

where $w_j^{(2,t,q)}$ is a comprehensive integrated weighting factor that characterizes the importance of indicator; an indication of $x_{ij}^{(2,t,q)}$ is a standard observation of an index of the j-th subordinate to the second hierarchical subsystem $s_q^{(2,t)}$ belonging to an i-th large system, where i=1, 2, ..., n; j=1, 2, ..., $m_{tq}$; t=1, 2, ..., $n_1$; q=1, 2, ..., $m_t$; then, the weighted index matrix is obtained;

$$A^{(2,t,q)} = \begin{bmatrix} x_{11}^{*(2,t,q)} & \cdots & x_{1m_{tq}}^{*(2,t,q)} \\ \vdots & \ddots & \vdots \\ x_{n1}^{*(2,t,q)} & \cdots & x_{nm_{tq}}^{*(2,t,q)} \end{bmatrix} \quad (16)$$

a corresponding positive definite matrix is $$H^{(2,t,q)} = (A^{(2,t,q)})^T A^{(2,t,q)} \quad (17)$$

constructing a comprehensive evaluation function of subsystems by linear weighted synthesis $$y_i^{(2,t,q)} = \sum_{j=1}^{m_{tq}} b_j^{(2,t,q)} x_{ij}^{*(2,t,q)}, \quad i = 1, 2, \ldots, n \quad (18)$$

a basic idea of determining the weight coefficient vector $b^{(2,t,q)}$ is to evaluate the difference between different evaluation objects and the evaluation target to a greatest extent and convert it into a mathematical language, even though a linear comprehensive evaluation function $y_i^{(2,t,q)}$ has a maximum degree of dispersion for the comprehensive evaluation values of n evaluation objects;

if $b^{(2,t,q)}$ is an eigenvector corresponding to a largest of all a basic eigenvalues of positive definite matrix $H^{(2,t,q)}$, then the evaluation value has a highest degree of discreteness;

after normalizing the eigenvector, the index weight coefficient vector is obtained; using formula (18), the comprehensive evaluation values of all subsystems $s_q^{(2,t)}$ of the evaluation object are obtained;

(IX) hierarchical evaluation of multilevel indicators for the three-level index of Y-axis geometric error, Z-axis geometric error, secondary indicators such as thermal error, specific performance indicators of the first-level indicators such as efficiency and reliability, repeat steps (I) to (VIII);

for the four third-level indicators $U_{111}$-$U_{114}$ under the geometric error, repeat steps (I) to (VIII) to obtain the comprehensive evaluation value of geometric error of different machine tools; it should be pointed out that a magnitude of data is consistent when the evaluation value of secondary index is calculated according to the evaluation value of three-level index; therefore, a standardization process is no longer performed;

for the three sublevel indicators $U_{11}$-$U_{13}$ under an accuracy, repeat steps (I) to (VIII) to obtain the comprehensive evaluation value of the accuracy of different machine tools.

\* \* \* \* \*